(12) United States Patent
Anderson et al.

(10) Patent No.: US 11,977,996 B2
(45) Date of Patent: *May 7, 2024

(54) SYSTEMS AND METHODS FOR DETERMINING A LIKELIHOOD OF A LEAD CONVERSION EVENT

(71) Applicant: REVAGENCY IP, LLC, Ft. Lauderdale, FL (US)

(72) Inventors: Brad L. Anderson, San Marcos, CA (US); Michael B. Anderson, San Marcos, CA (US); Jeffrey R. Anderson, San Marcos, CA (US)

(73) Assignee: Revagency IP, LLC, Ft. Lauderdale, FL (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/666,367

(22) Filed: Feb. 7, 2022

(65) Prior Publication Data

US 2022/0164755 A1 May 26, 2022

Related U.S. Application Data

(63) Continuation-in-part of application No. 16/581,617, filed on Sep. 24, 2019, now Pat. No. 11,244,257, which is a continuation of application No. 15/909,890, filed on Mar. 1, 2018, now Pat. No. 10,423,906, which is a continuation of application No. 14/838,099, filed on Aug. 27, 2015, now Pat. No. 9,940,592, which is a continuation of application No. 11/774,378, filed on Jul. 6, 2007, now Pat. No. 9,137,371.

(51) Int. Cl.
*G06Q 10/06* (2023.01)
*G06Q 10/0631* (2023.01)
*G06Q 30/08* (2012.01)
*G06Q 50/14* (2012.01)
*H04M 3/523* (2006.01)

(52) U.S. Cl.
CPC ..... *G06Q 10/063112* (2013.01); *G06Q 30/08* (2013.01); *G06Q 50/14* (2013.01); *H04M 3/5233* (2013.01)

(58) Field of Classification Search
CPC .......... G06Q 10/063112; G06Q 30/08; G06Q 50/14; H04M 3/51; H04M 3/523; H04M 3/5233
USPC ...................................................... 379/265.01
See application file for complete search history.

(56) References Cited

U.S. PATENT DOCUMENTS 5,970,132 A   10/1999  Brady
6,134,318 A   10/2000  O'Neil
(Continued)

OTHER PUBLICATIONS

International Search Report and Written Opinion in PCT/US2008/069234, dated Sep. 3, 2008.

*Primary Examiner* — Harry S Hong
(74) *Attorney, Agent, or Firm* — Sheppard Mullin Richter & Hampton LLP

(57) ABSTRACT

Systems and methods are provided for generating, processing and distributing leads, the system comprising a leads processing engine for receiving customer requests, creating leads based upon the customer requests, determining a best available agent or agents for each lead from a pool of available agents based upon one or more selected factors, and offering and/or sending each lead to the best available agent or agents.

10 Claims, 4 Drawing Sheets

(56) References Cited

U.S. PATENT DOCUMENTS

| | | |
|---|---|---|
| 6,704,396 B2 | 3/2004 | Parolkar |
| 7,035,699 B1 | 4/2006 | Anderson |
| 7,899,177 B1 | 3/2011 | Bruenling |
| 9,137,371 B2 | 9/2015 | Anderson |
| 9,940,592 B2 | 4/2018 | Anderson |
| 10,423,906 B2 | 9/2019 | Anderson |
| 11,244,257 B2 * | 2/2022 | Anderson .............. G06Q 50/14 |
| 2001/0047289 A1 | 11/2001 | McKee |
| 2002/0022977 A1 | 2/2002 | Schiff |
| 2002/0077871 A1 | 6/2002 | Udelhoven |
| 2002/0147732 A1 | 10/2002 | Lee |
| 2003/0169870 A1 | 9/2003 | Stanford |
| 2004/0143473 A1 | 7/2004 | Anderson |
| 2004/0202308 A1 | 10/2004 | Baggenstoss |
| 2005/0111653 A1 | 5/2005 | Joyce |
| 2005/0135335 A1 | 6/2005 | Hession |
| 2005/0261929 A1 | 11/2005 | Hansen |
| 2006/0093123 A1 | 5/2006 | Becerra |
| 2006/0265259 A1 | 11/2006 | Diana |
| 2006/0277115 A1 | 12/2006 | McKee |
| 2007/0041551 A1 | 2/2007 | Whitecotten |
| 2007/0127687 A1 | 6/2007 | Yoshizawa |
| 2008/0140496 A1 | 6/2008 | Mink |
| 2009/0010410 A1 | 1/2009 | Anderson |
| 2013/0151314 A1 | 6/2013 | Kugler |
| 2015/0278709 A1 | 10/2015 | Zeng |
| 2015/0371174 A1 | 12/2015 | Anderson |
| 2017/0013131 A1 | 1/2017 | Craib |
| 2018/0189712 A1 | 7/2018 | Anderson |
| 2020/0019915 A1 * | 1/2020 | Anderson .............. G06Q 30/08 |

* cited by examiner

```
                                                    ┌─ 300
                                                    ▼

┌─────────────────────────────────────────────────────────────────┐
│  Obtain Information Related to Converted Leads During a         │
│                    Particular Time Period;                      │
│                              310                                │
└─────────────────────────────────────────────────────────────────┘
                                │
                                ▼
┌─────────────────────────────────────────────────────────────────┐
│      Obtain Previously Generated Lead Score for Converted Leads;│
│                              320                                │
└─────────────────────────────────────────────────────────────────┘
                                │
                                ▼
┌─────────────────────────────────────────────────────────────────┐
│        Obtain Agent's Previously Determined Expected Performance;│
│                              330                                │
└─────────────────────────────────────────────────────────────────┘
                                │
                                ▼
┌─────────────────────────────────────────────────────────────────┐
│   Determine Agent's Actual Performance Based on the Converted   │
│                        Leads Information;                       │
│                              340                                │
└─────────────────────────────────────────────────────────────────┘
                                │
                                ▼
┌─────────────────────────────────────────────────────────────────┐
│  Compare Agent's Previously Determined Expected Performance to  │
│                   Agent's Actual Performance;                   │
│                              350                                │
└─────────────────────────────────────────────────────────────────┘
                                │
                                ▼
┌─────────────────────────────────────────────────────────────────┐
│              Update Previously Determined Agent Ranking.        │
│                              360                                │
└─────────────────────────────────────────────────────────────────┘
```

FIG. 3

SYSTEMS AND METHODS FOR DETERMINING A LIKELIHOOD OF A LEAD CONVERSION EVENT

RELATED APPLICATIONS

This application is a continuation-in-part of U.S. patent application Ser. No. 16/581,617, filed Sep. 24, 2019, now U.S. Pat. No. 11,244,257, which is a continuation of U.S. patent application Ser. No. 15/909,890 filed Mar. 1, 2018, now U.S. Pat. No. 10,423,906, which is a continuation of U.S. patent application Ser. No. 14/838,099, filed Aug. 27, 2015, now U.S. Pat. No. 9,940,592, which is a continuation of U.S. patent application Ser. No. 11/774,378, filed Jul. 6, 2007, now U.S. Pat. No. 9,137,371, the contents of which are incorporated herein by reference in its entirety.

TECHNICAL FIELD

The present disclosure is generally related to the generation and distribution of leads. More particularly, the present disclosure is directed to systems and methods for generating, processing, and distributing leads using a leads processing engine.

BACKGROUND

With the advent of the Internet and its ease of use to research and book travel, travel agencies had to change their model to successfully compete. In a traditional setting, customers would visit retail storefront or "brick and mortar" travel agency locations and make travel plans while looking at brochures and sitting face-to-face with a travel agent. As the Internet became more and more prevalent in the travel industry, storefront locations began closing and many travel agents were faced with a choice—find a new career or open their own home-based travel agency. Many home-based travel agents own and operate their own business and use a host agency that may provide benefits such as higher commission levels from suppliers, support and technology.

Some host agencies and others in the travel industry have attempted to send leads out to one or more travel agents as part of a large email blast along with details of the customer lead and contact information. Once an email is received, one or more travel agents contact the customer directly and then the customer selects the "best offer". Agents are often charged per lead or share in the commission. Another prior method comprises sending out a mass Instant Message to a large pool of agents, wherein the first to respond gets the lead or simply transferring customer leads by phone common ACD phone systems and typical distribution methods such as longest available or round-robin. A disadvantage of all of these methods used to distribute leads is that none determine and distribute based on which particular agent or agents are most likely to convert not just the current lead but will also generate additional and ongoing sales from these leads thru returning customers and referrals thereby optimizing the ROI for both the selling agent and the company providing the leads.

SUMMARY

In accordance with one or more embodiments, various features and functionality can be provided to enable or otherwise facilitate distribution of phone leads, electronic leads, and web leads to agents working at local and remote locations.

In some embodiments, a likelihood of a lead conversion event may be determined. For example, the likelihood of conversion may be determined by obtaining lead attribute information associated with a lead received over means for receiving and entering incoming customer requests. In some embodiments, the lead attribute information may comprise individual lead factors including at least one of a lead type, a lead submission method, a lead submission urgency level, and a vendor class.

Next, the likelihood of conversion may be determined by obtaining historic booking information associated with previously submitted leads by a customer submitting an incoming request may be determined. For example, the historic booking information associated with the previously submitted leads may include leads that have lead information including the same vendor class as the lead received. In some embodiments, the previously submitted leads comprise a date of submission, and wherein the date of submission does not exceed 12 months form a current date. In some embodiments, the lead conversion event for the lead may comprises a sales transaction or a booking.

Finally, a likelihood of a lead conversion event for the lead received may be determined based on the lead attribute information and the historic booking information. In some embodiments, the likelihood determination may be made by assigning a weight to each of the individual lead factors. In some embodiments, the likelihood determination may be made using a machine learning model. In other embodiments, the likelihood determination may be made using a predictive model, e.g. Bayesian statistics.

In some embodiments, the likelihood of conversion may be determined by obtaining online behavior information associated with the customer submitting the incoming request. For example, the online behavior information may include time spent by the customer on a website prior to submitting the request.

BRIEF DESCRIPTION OF THE DRAWINGS

FIG. 3 illustrates an example process for updating an agent ranking score determined by the leads processing system of FIG. 1, according to an implementation of the disclosure.

DETAILED DESCRIPTION

Figure 1:
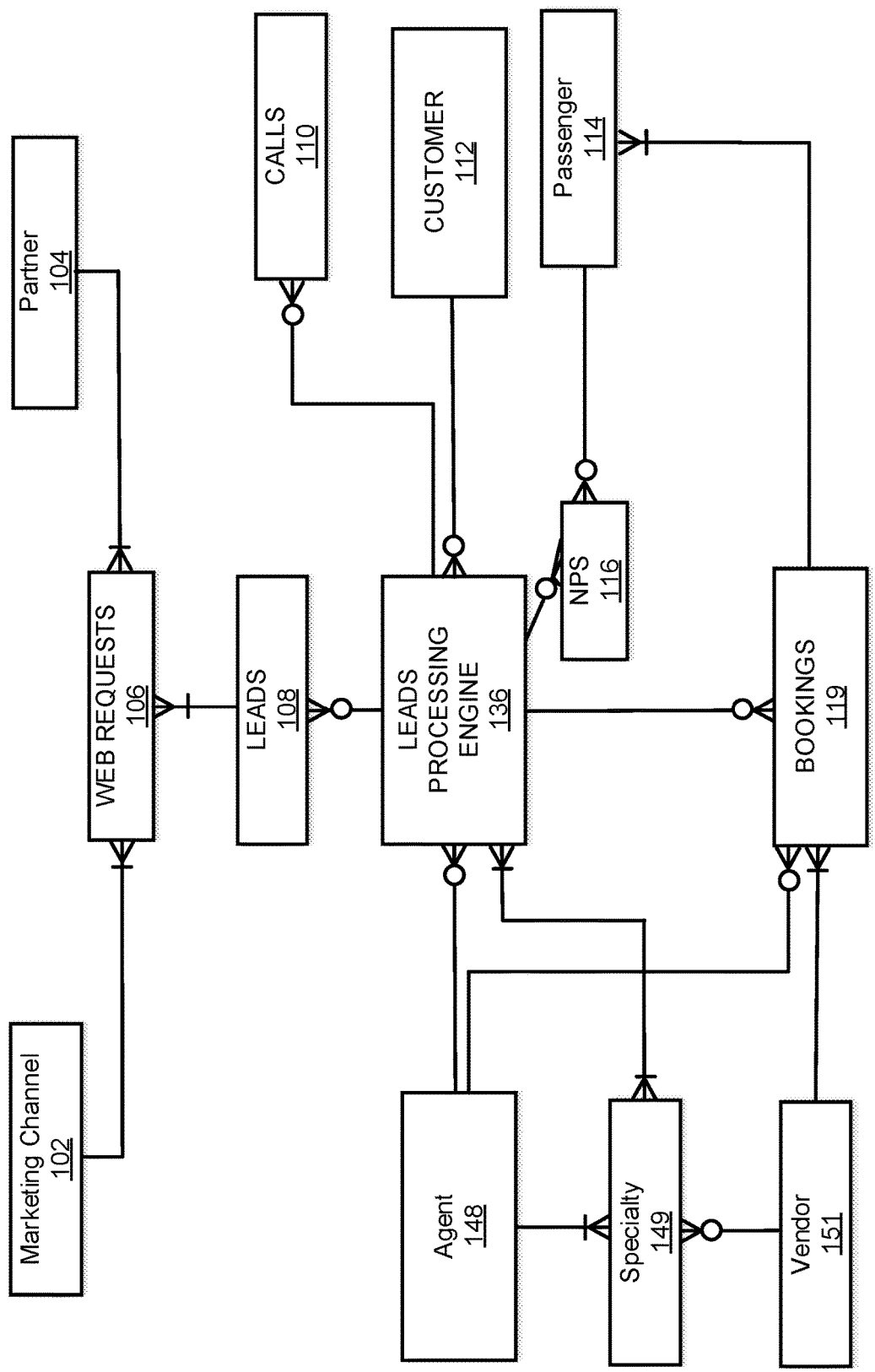
FIG. 1 illustrates an example workflow for distributing leads, according to an implementation of the disclosure.

Described herein are systems and methods for distributing leads by determining a likelihood of a lead conversion event occurrence and utilizing it to assess agent performance. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

As alluded to above, conventional methods of distributing leads on a "first come, first serve" basis fail to take into account agent performance and lead and/or customer related information. That is, without a process that evaluates both quality of leads and agent performance results in missed sales opportunities. In particular, leads that are likely to be closed or converted may not actually result in a sale by virtue of being distributed to agents that lack the skills necessary for a successful closing. Accordingly, distributing leads to a pool of agents without taking into consideration a determination of likelihood that a lead will result in a sale is not an effective way to enable a full realization of potential sales opportunities.

In accordance with various embodiments, leads can be evaluated and determinations about a likelihood of a particular lead resulting in a sale may be made. For example, various attributes and characteristics associated with a lead and a customer associated with that lead are taken into consideration when making this determination. Further, when distributing or assigning leads to agents, determination related to agent performance are made. That is, agents are evaluated and ranked based on their performance, i.e., their ability to convert a lead to a sale. In particular, determinations are made with respect to agent's expected performance and evaluated against agent's actual performance. Leads with a higher likelihood of conversion are then distributing to agents that are expected to convert the leads by virtue of being better performers. Indeed, by determining which leads are more lucrative and assigning them to high performing agent, allows the current embodiments to ensure that all of the potential sales opportunities are fully realized.

As used herein the term, "agents," may include independent affiliates, independent contractors, agencies, individual agents, other companies and other workers.

The term "agent tiers," may include levels that are calculated on a periodic (e.g., daily) basis using one or more of the factors described herein.

The term "API" means Agency Performance Index and may include ranking of agent or agents. The term "sAPI" means Specialty Agency Performance Index" and may include ranking of the agent or agents within a given specialty.

The term "host agency," may include a company having a group of independent contractors or franchisees that use the host agency's buying power for increased commission levels, support and/or technology.

The term "best available agent," may include the agent or agents that is most likely to generate the highest ROI for the company (e.g., host agency), agent and customer in terms of both quantity, quality, value and experience from the leads distributed.

The term "booking," may include any sale that has been deposited by a customer for a reservation.

The term "business source," may include a metric for sales performance.

The term "leads," may include any type of customer submission to the host agency, such as a new call, web submission, or live chat. In accordance with various embodiments, the leads may include, but are in no way limited to, sales leads, help leads, and support request leads.

The term "vendor," may include a type of provider (e.g., a cruise line, a tour company, a hotel brand). The term "specialty," may include a vendor, destination, travel style, and so on. The term "class," may include a grouping of leads by a provider within in a similar or peer category.

The term "last contact," may include the agent of last contact is the agent who last emailed, called, or contacted the customer.

Before describing the technology in detail, it is useful to describe an example workflow model in which the presently disclosed technology can be implemented. FIG. 1 illustrates one such example workflow model.

FIG. 1 illustrates an example workflow for distributing leads by ranking agents and assigning lead scores to incoming leads, as described herein. For example, the workflow may include leads 108 submitted as web requests 106 to a leads processing engine 136. In some embodiments, web requests 106 may originate through a marketing channel 102 or through a partner 104. In some embodiments, leads 108 may be submitted via the Internet (or via a text message, etc.)

In some embodiments, leads processing engine 136 may receive requests submitted through customer calls 110, or customer calls via a customer care representative 112. For example, customer may dial into a call center location wherein a customer care representative (CCR) answers the call, and enters the information related to customer and lead into leads processing engine 136. Alternatively, VOIP, web leads, and/or other technologies may be employed to obviate the need for call center representatives by allowing leads to be processed automatically. According to a further embodiment, leads processing engine 136 may be used in selling or distributing leads to outside sources.

In some embodiments, leads processing engine 136 may distribute leads to the best available agent (e.g., agent 148) by utilizing a algorithm that considers a number of relevant factors, rankings, and/or categories, as described in further detail below. In some embodiments, leads processing engine 136 may distribute leads by ranking agents and assigning a lead score to the incoming leads, as described herein. According to further embodiments of the invention, the algorithm may be configured to determine a group or tier of individual agents that are most likely to close a particular lead based upon the selected factors, rankings, and/or categories. Individual agents may be part of a pool of agents and may be associated with a particular specialty (e.g., a specialty 149) and/or a particular vendor (e.g., vendor 151).

Figure 2:
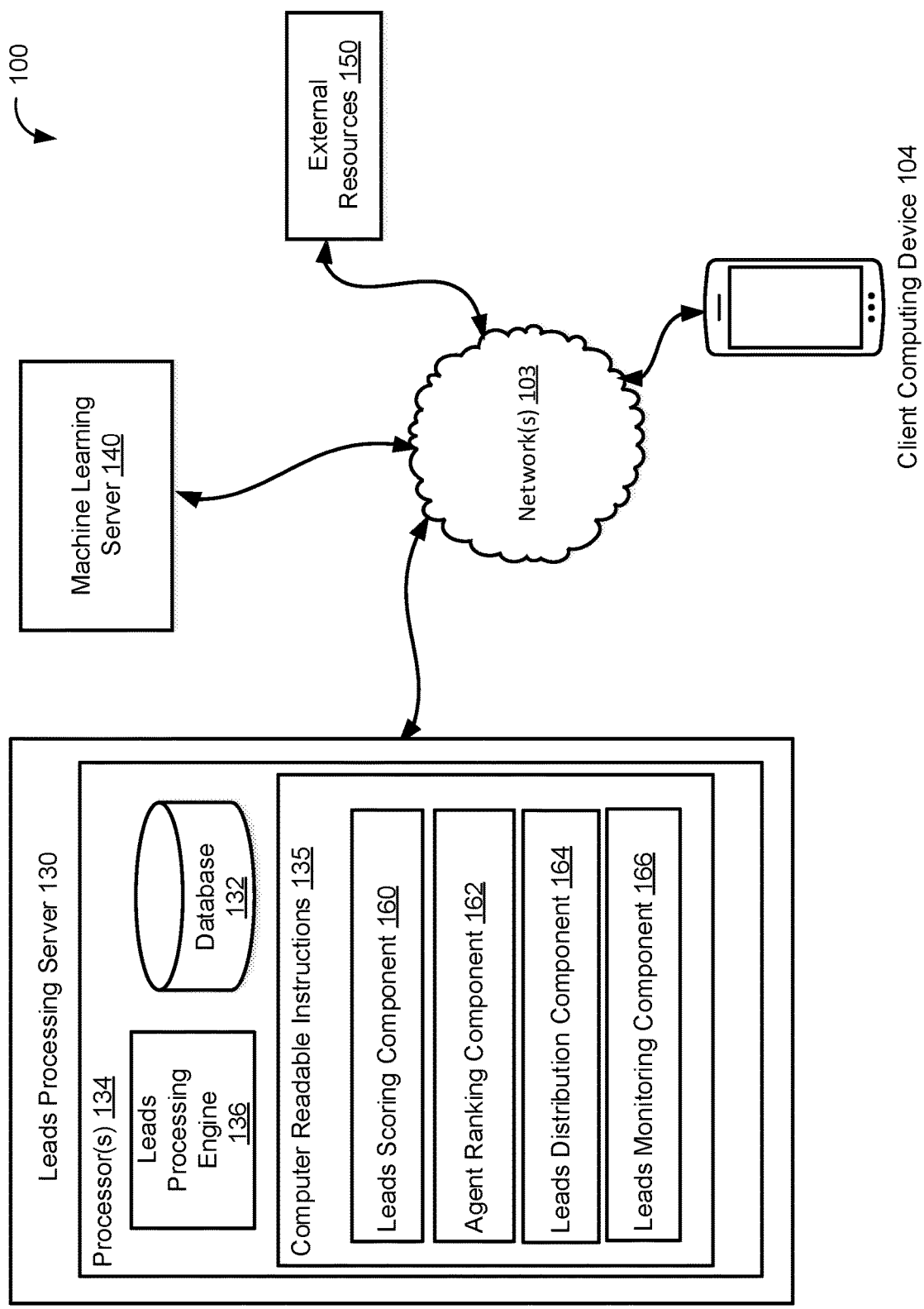
FIG. 2 illustrates an example leads processing system, according to an implementation of the disclosure.

The presently disclosed technology can be implemented in an example environment. FIG. 2 illustrates one such example lead distribution system 100 configured in accordance with one embodiment.

Lead distribution system 100 or components/features thereof may be implemented in combination with, or as an alternative to, other systems/features/components described herein, such as those described with reference to other embodiments and figures. Lead distribution system 100 may additionally be utilized in any of the methods for using such systems/components/features described herein. Lead distribution system 100 may also be used in various applications and/or permutations, which may or may not be noted in the illustrative embodiments described herein. For instance, lead distribution system 100 may include more or less features/components than those shown in FIG. 2, in some embodiments. Moreover, lead distribution system 100 is not limited to the number of components, etc. specifically shown in FIG. 2, although one or more aspects of lead distribution system 100 may have particular component constraints in certain embodiments, as these one or more aspects may impact the detection capabilities of lead distribution system 100.

As illustrated in FIG. 2, lead distribution system 100 may be configured to distribute leads by ranking agents and assigning a lead score to the incoming leads, as described herein. In some embodiments, lead distribution system 100 may include a leads processing server 130, a machine learning server 140, a one or more client computing device(s) 104, a one or more external resources 150, and a network 103.

In some embodiments, users of lead distribution system 100 (e.g., agents) may access the lead distribution engine 136 via client computing devices(s) 104. In some embodiments, the various below-described components of FIG. 2 may be used to initiate a client application (not shown) within client computing device 104 configured to display leads assigned to a particular agent. For example, a client application may be configured to allow agents to receive lead assignments based on determinations made by leads processing engine 136, as alluded to above.

In some embodiments, leads processing server 130 may include a processor 134, a memory, and network communication capabilities. In some embodiments, leads processing server 130 may be a hardware server. In some implementation, leads processing server 130 may be provided in a virtualized environment, e.g., leads processing server 130 may be a virtual machine that is executed on a hardware server that may include one or more other virtual machines. Leads processing server 130 may be communicatively coupled to a network 103. In some embodiments, leads processing server 130 may transmit and receive information to and from one or more of, machine learning server 140, client computing device(s) 104, one or more external services 130, and/or other servers via network 103.

In some embodiments, leads processing server 130 may include leads processing engine 136, as alluded to above. In some embodiments, leads processing server 130 may also include a database 132. For example, database 132 may store information related to leads, customers, agents and/or other information, as described in further detail below.

In some embodiments, machine learning server 140 and/or other components of lead distribution system 100 may be configured to use machine learning, e.g., use a machine learning model that utilizes machine learning to determine a likelihood of a lead conversion event occurrence, as described in further detail below. In some embodiments, machine learning server 140 may include one or more processors, memory and network communication capabilities. In some embodiments, machine learning server 140 may be a hardware server connected to network 103, using wired connections, such as Ethernet, coaxial cable, fiber-optic cable, etc., or wireless connections, such as Wi-Fi, Bluetooth, or other wireless technology. In some embodiments, machine learning server 140 may transmit data between one or more of leads processing server 130, client computing device 104, external resources 130, and/or other components via network 103.

In some embodiments, external resources 150 may comprise one or more of lead submission platforms provided by one or more external agencies or systems. In some embodiments, lead submission platforms may include websites that allow customers to submit leads, third party platforms associated with marketing channels and partners, and/or other similar services. In some embodiments, submission platforms may include one or more servers, processors, and/or databases that can store lead and customer information, e.g., lead type, specialty type, vendor type, and other such information provided by one or more external systems resources 150. The lead and customer related information may be used by the leads processing engine 136 when determining lead scores, as will be further described in detail below.

In some embodiments, leads processing engine 136 may communicate and interface with a framework implemented by external resources 150 using an application program interface (API) that provides a set of predefined protocols and other tools to enable the communication. For example, the API can be used to communicate particular data from a website or a marketing channel used to connect to and synchronize with leads processing engine 136.

In some embodiments, client computing device 104 may include a variety of electronic computing devices, such as, for example, a smartphone, tablet, laptop, computer, wearable device, television, virtual reality device, augmented reality device, displays, connected home device, Internet of Things (IOT) device, an enhanced general packet radio service (EGPRS) mobile phone, a media player, a navigation device, a game console, a television, a remote control, or a combination of any two or more of these data processing devices, and/or other devices. In some embodiments, client computing device 104 may present content to a user and receive user input. In some embodiments, client computing device 104 may parse, classify, and otherwise process user input. For example, client computing device 104 may store user input associated with an agent claiming or selecting a lead, as will be described in detail below.

Further, FIG. 2 illustrates an example leads processing server 130 configured in accordance with one embodiment. In some embodiments, as alluded to above, leads processing server 130 may include a leads processing engine 136. In some embodiments, leads processing engine 136 may be operable by one or more processor(s) 134 configured to execute one or more computer readable instructions 135 of one or more computer program components. In some embodiments, the computer program components may include one or more of a leads scoring component 160, an agent ranking component 162, a leads distribution component 164, a leads monitoring component 166, and/or other such components.

Lead Scoring

In some embodiments, leads scoring component 160 may be configured to determine a likelihood of a lead conversion event occurrence for each incoming lead. For example, a lead conversion event may include a booking of a particular trip or vacation. By virtue of determining a likelihood of a lead conversion event occurrence, leads scoring component 160 may predict the likelihood that a lead will be converted (turned into a booking) by one of the agents. In some embodiments, a likelihood of a lead conversion event occurrence determination may be used to allow leads distribution system 100 to steer revenue optimization, as alluded to above. For example, an accurate likelihood of a lead conversion event occurrence determination may allow to optimize the lead distribution processes resulting in more lead conversions. Additionally, it may allow system 100 to improve evaluation of agent performance by virtue of monitoring the quality of leads created and claimed by the agents, as described in further detail below.

In some embodiments, leads scoring component 160 may be configured to determine a likelihood of a lead conversion event occurrence by utilizing a variety of lead attributes or factors obtained from a variety of datasets. For example, historical data and characteristics associated with customers and leads may be utilized, as described in further detail below.

In some embodiments, when determining a likelihood of a lead conversion event occurrence, leads scoring component 160 may utilize information associated with a customer submitting a lead. For example, a customer that has previously booked a vacation through leads distribution system 100 is more likely to book again. In contrast, a new customer or a previous customer that has not booked is less likely to buy from an agent provided by leads distribution system 100. In some embodiments, customer information may include booking history, lead history, a net promoter score ("NPS") history, and/or other similar information when determining a likelihood of a lead conversion event occurrence.

In some embodiments, when determining a likelihood of a lead conversion event occurrence, leads scoring component 160 may utilize website behavior information associated with the customer submitting the lead. For example, a customer that was very active on the a lead submission website (e.g., expressed as a number of hits or number of submissions) is more likely to book than a customer with minimal activity on the website. In some embodiments, website behavior information may include information related to a marketing channel used, web hit count information, webs submission count information, and other similar information. In yet other embodiments, website behavior information may include website behavior information during a particular time period. For example, during a time period associated with the current lead submission, a time period preceding the lead submission and a time period subsequent to the lead submission.

In some embodiments, when determining a likelihood of a lead conversion event occurrence, leads scoring component 160 may utilize lead specific attribute information associated with the current lead. In some embodiments, a lead attribute information may include lead submission type (website or call), lead submission urgency level, submission response time period, vendor information, including vendor name and vendor class, and other similar information. For example, a lead that comes in as an "urgent" lead via an inbound call is more likely to convert than a lead that is "just shopping" that comes in via a web submission.

In some embodiments, when determining a likelihood of a lead conversion event occurrence, leads scoring component 160 may utilize additional customer parameters. In some embodiments, additional customer parameters may include ability to contact the customer and/or a type of "hand-off" to agent used. For example, if a CCR can easily reach the customer and hand-off the lead to the agent over the phone, then that lead is more likely to convert, compared to a lead resulting in numerous unsuccessful attempts to contact a customer.

In some embodiments, leads scoring component 160 may be configured to determine a likelihood of a lead conversion event occurrence using a number of models or methods. For example, Bayesian-type statistical analysis may be used during the likelihood determination.

In some embodiments, leads scoring component 160 may be configured to assign specificity, relevance, confidence, and/or weight to each factor used in determining a likelihood of a lead conversion event occurrence. For example, booking history information and website behavior information associated with a customer submitting a lead, lead specific attribute information associated the current lead, additional customer parameters, and/or other information may be assigned with specificity, relevance, confidence, and/or weight based on the relevance and relationship between each data point to one another. For example, a higher weight may be assigned to customer historic booking information. By virtue of assigning different weights to individual factors, allows leads scoring component 160 to determine the likelihood more accurately.

In some embodiments, booking history information and website behavior information associated with a customer submitting a lead, lead specific attribute information associated the current lead, additional customer parameters, and/or other information may be used in conjunction with one or more predictive models.

The predictive model(s), in various implementation, may include one or more of neural networks, Bayesian networks (such as Hidden Markov models), expert systems, decision trees, collections of decision trees, support vector machines, or other systems known in the art for addressing problems with large numbers of variables, as further described in detail below. In some embodiments, specific information analyzed may vary depending on the desired functionality of a particular predictive model In some embodiments, leads scoring component 160 may be configured to utilize machine learning, i.e., a machine learning model that utilizes machine learning algorithms to determine which lead attributes will be used when determining a likelihood of a lead conversion event occurrence. For example, in a training stage the leads scoring component 160 (or other component) can be trained using training data (e.g., customer historic information, customer website behavior, lead information, lead historical information, etc.) related to leads, and then at an inference stage can determine the likelihood of a lead being converted to an actual sale. For example, the machine learning model can be trained using synthetic data, e.g., data that is automatically generated by a computer, with no use of user information. In some embodiments, the machine learning model can be trained based on sample data, e.g., sample lead data. For example, sample data may include information related to prior leads associated with a customer. Based on the sample data, the model can predict lead attributes, which may then be used to determine a likelihood of a lead conversion event occurrence.

In some embodiments, leads scoring component 160 may be configured to use one or more of a deep learning model, a logistic regression model, a Long Short Term Memory (LSTM) network, supervised or unsupervised model, etc. In some embodiments, leads scoring component 160 may utilize a trained machine learning classification model. For example, the machine learning may include, decision trees and forests, hidden Markov models, statistical models, cache language model, and/or other models. In some embodiments, the machine learning may be unsupervised, semi-supervised, and/or incorporate deep learning techniques.

In some embodiments, a likelihood of a lead conversion event occurrence may be expressed as lead scores. For example, a lead score may be expressed on a sliding scale of percentage values (e.g. 10 percent, 15 percent, . . . n, where a percentage may reflect likelihood of conversion occurrence), numerical values (e.g., 1, 2, . . . n, where a number may be assigned as low and/or high), verbal levels (e.g., very low, low, medium, high, very high, and/or other verbal levels), and/or any other scheme to represent a confidence score. For example, leads scoring component 160 may determine that Lead A has a 20 percent likelihood of resulting in a sale, whereas Lead B has only a 5 percent likelihood of resulting in a sale, and Lead C has a 50 percent likelihood of resulting in a sale.

In some embodiments, leads scoring component 160 may be configured to determine a likelihood of a lead conversion event occurrence for a lead at different time periods. For example, a likelihood of lead's conversion may be determined at a number of different time periods (e.g., three). The likelihood of conversion at different times may be different. That is, the likelihood of conversion may have a tendency to be more accurate as time goes by. For example, a strong likelihood of conversion may become stronger and a weak likelihood of conversion may become weaker over time. In some embodiments, a first time may include a time a lead is first captured or recorded, a second time may include the time the lead is obtained by the leads processing server 130, and a third time may include a time after the lead is distributed or claimed by an agent. In some embodiments, the time period for determining the likelihood of lead conversion after being claimed by an agent may occur within a specified period after being claimed (e.g., one day after). By virtue of determining a likelihood of a lead conversion event occurrence for a lead at different time periods, provides for differentials that may be utilized to improve the accuracy of likelihood determinations.

In some embodiments, when utilizing a variety of lead attributes or factors obtained from a variety of datasets to determine a likelihood of a lead conversion event occurrence, leads scoring component 160 may be configured to limit historic data utilized. For example, only information obtained within the last 12 months may be utilized. In some embodiments, the information obtained within the last two months may be excluded when used a likelihood of a lead conversion event occurrence determination. By limiting the historic data to recent but not most recent data allows leads scoring component 160 to ensure that only valid and relevant data is being used. That is, older data may not be as indicative of future performance as more recent data. For example, using older data may result in a likelihood determination that is not as accurate as it may reflect customer behavior that is no longer attributable to that customer. For example, a customer may have historic data indicating that five years ago their leads were resulting in bookings. However, because due to having a child one year ago, the customer can no longer travel as much as they used to, thus making the likelihood determination based on the five year old data less than accurate. In some embodiments, leads scoring component 160 may be configured to assign weight to historic data based on a time period that elapsed since most recent activity. For example, a higher score (e.g., 100%) may be assigned to historic data that includes activity which occurred within the last 90 days. Similarly, a lower score (e.g., 80%) may be assigned to historic data that includes activity which occurred during a period ranging between 91 to 180 days. Finally, even lower scores (e.g., 70% and 60%) may be assigned to historic data that includes activity which occurred during a period ranging between 181 to 270 and 271 to 360 days, respectively.

In some embodiments, when utilizing a variety of lead attributes or factors obtained from a variety of datasets to determine a likelihood of a lead conversion event occurrence, as alluded to above, leads scoring component 160 may limit a data set to a predetermined number of records (e.g., 30).

In some embodiments, leads scoring component 160 may obtain incomplete data sets, i.e., where the number of records is less than the predetermined number of records. In that scenario, leads scoring component 160 may be configured not to limit the historic data based on a time period during which it was generated. Instead, historic data that includes activity which occurred more than twelve months ago would be utilized by leads scoring component 160 when the number of records does not result in a complete data set.

In some embodiments, leads scoring component 160 may utilize a different predictive model for different types of leads. For example, a likelihood of a lead conversion event occurrence for one type or group of leads may be determined using a Bayesian network model while machine learning may be used for another group, and so on.

In some embodiments, leads scoring component 160 may be configured to test the accuracy of a likelihood determination by comparing it to actual lead conversion information. For example, likelihood data collected over a particular time period (e.g., a year) may be compared with actual lead conversion data to assess accuracy of the predictive model or algorithm utilized.

In some embodiments, when testing the accuracy of the precative model, as alluded to above, leads scoring component 160 may be configured to generate lead scores for all leads when testing the accuracy of one or models. For example, first, lead scores for all the leads being tested may be determined. Next, the lead scores may be ranked based on their lead scores from highest to lowest. Finally, the lead scores may be divided into equal groups (e.g., twenty groups) such that each group may include a particular percentage of leads (e.g., 5 percent of leads).

Agent Ranking

As alluded to above, lead distribution system 100 is configured to distribute leads to agents in a way that is more likely to result lead conversion (i.e., a lead being converted to an actual sale). In some embodiments, to achieve this, lead distribution system 100 is configured to distribute leads to the highest ranked agents available, as further described below. That is, leads are distributed to those agents that are more likely to convert them.

In some embodiments, agent ranking component 162 is configured to determine a ranking score or agency performance index (API) for all participating agents. For example, a ranking score may be determined based on agent performance. In some embodiments, agent performance may be determined by comparing actual agent performance and expected agent performance. For example, actual agent performance may be determined based the number of leads the agent actually converted. Conversely, expected agent performance may be determined based on a lead score (i.e., a likelihood of a conversation event occurrence determined by leads scoring component 160) for those leads. In some embodiments, actual agent performance may be determined for a particular time period (e.g., 90 days).

In some embodiments, a ranking score assigned to an agent may be determined by taking into account the lead score determined by leads scoring component 160. Because all agents receive different leads, i.e., leads that have different lead attributes and type (i.e., leads in different specialties, leads originating from a different claim method) and are associated with different clients (e.g., some leads will come from repeat customers, etc.), using lead scores to determine expected agent performance may not be an accurate way of determining agent performance uniformly. For example, leads in some specialties have a tendency to convert at a higher rate. Similarly, leads that are claimed by an agent over the phone have a higher tendency of conversion. Moreover, leads that originated as a phone call also have a higher tendency of conversion. By virtue of utilizing lead scores when determining an agent ranking score, as alluded to above, results in normalizing and standardizing agent performance across multiple specialties, working with leads that have different attributes, coming from different customers, and so on.

In some embodiments, a ranking score assigned to an agent may be expressed as a ratio of actual agent performance to expected agent performance. That is a higher score may indicate that the agent converted a higher number of leads.

In some embodiments, agent performance may be determined by comparing actual agent performance and expected agent performance to the actual and expected performance by agents within the a particular specialty. As alluded to above, some specialties tend to have higher lead scores. Accordingly, by virtue of limiting agent performance to a specialty results in a more accurate prediction of future agent's performance. In some embodiments, agent performance may be determined by comparing actual agent performance and expected agent performance to the actual and expected performance by agents within a particular specialty for a particular time period (e.g., last 90 days).

In some embodiments, agent performance may be determined by comparing actual agent performance and expected agent performance to the actual and expected performance by agents within a particular specialty, within a particular class, or within a particular vendor. Because not all agents may have activity within the last 90 days for a given specialty, by virtue of determining agent performance within a particular class or within a particular allows agent ranking component 162 to provide an accurate prediction of future agent's performance even when relevant information is not available.

In some embodiments, in addition to determining an agent ranking score based on agent performance, agent ranking component 162 may be configured to assign a ranking score to all participating agents based on commission generated.

In some embodiments, agent ranking component 162 may be configured to determine a ranking score to all participating agents based on actual and expected performance for a particular business source within the specialty only.

In some embodiments, agents may be required to meet a claim threshold criteria. For example, a claim threshold may a number of claims converted by an agent within a particular class, vendor, and/or specialty in a particular time period. In some embodiments, different claim thresholds may be utilized for different time periods, different classes, vendors, and/or specialties.

In some embodiments, in addition to meeting a certain claim threshold, agents may be required to meet a claim count criteria. For example, a claim count criteria may include a number of converted claims exceeding the expected performance by one claim. For example, if an agent's expected performance in a particular specialty within the last 90 days is 5%, then their claim count criteria would be:

(1/0.05+1)*1=21.

By virtue of applying a claim count criteria results in ranking only those agents that have sufficient activity or volume, thereby ensuring accuracy of the ranking. For example, if an agent has claimed three leads and converted one lead during the last 90 days, the prediction of that agent's future performance will likely be less accurate (i.e., that the agent will continue to perform at a particular level). However, by virtue of using performance data for the past 360 days during which the agent has claimed 150 leads and converted 50 leads, results in a more accurate determination of agent's performance In some embodiments, agent ranking component 162 may be configured to rank agents based on an order of priority assigned to their performance in other specialties. For example, if an agent performance cannot be ranked due to not having recent claim activity within a particular specialty, by virtue of using order of priority (i.e., performance in other specialties in same class) results in an accurate determination of future agent performance despite lack of actual performance data.

In some embodiments, agent ranking component 162 may be configured to group agents to a particular percentile group (e.g., 10 percentile) based on the rankings for each source of business. In some embodiments, agent ranking component 162 may be configured to determine an order for a ranking score for a particular business source within the specialty for agents that meet a particular claim threshold and a particular claim count criteria for individual percentile groups. For example, if there are 200 agents that meet claim criteria in last 90 days for a respective specialty, then each 10-percentile group will be comprised of 20 agents and their ranking score would be ordered from the highest (e.g., 1) to the lowest (e.g., 10).

In some embodiments, agent ranking component 162 may be configured to assign a default ranking score to new agents. For example, new agents may agents that have been a part of lead distributing system 100 less than a particular time period (e.g., less than 60 days). In some embodiments, a default ranking score assigned to new agents may be a median or average ranking score. By virtue of assigning a default ranking score allows lead distribution system 100 to facilitate new agents to build their claim activity as if they had been performing for some time.

In some embodiments, agent ranking component 162 may be configured to group all available agents for a particular specialty based on a type of lead. In some embodiments, agent ranking component 162 may be configured to provide a ranking of agents derived from one or more selected factors. The first available agent (from the top tier of agents for the particular specialty) that selects claims on the lead is then assigned to the lead.

In some embodiments, tier levels for a predetermined specialty or combination of specialties are calculated based upon one or more of the following factors: (1) closing ratio based upon a specific vendor (e.g., Carnival Cruise Lines, Norwegian Cruise Lines, etc.) and/or destination (e.g., Hawaii, Europe, Mexico, etc.); (2) total sales over a selected time frame (e.g., the past 30 days, 60 days, 90 days, etc.) with respect to a selected vendor and/or destination; (3) total SQi (Service Quality Index) scores, a calculation to measure customer service and customer experience including data from general customer feedback and from customer surveys sent at various times whether a lead is converted to a booking or not; (4) recency and/or total "available" time agent has been logged in the leads processing engine; (5) repeat and/or referral customer percentages overall and/or per lead; (6) average revenue per sale by vendor and/or destination; (7) average revenue per lead by vendor and/or destination; (8) average bookings per lead claimed; (9) agent education and/or industry based certifications from vendors, destinations, and educational outlets; (10) maximum amount per lead (% and/or $) agent is willing to pay; (11) minimum share of commission per lead (% and/or $) agent is willing to accept; (12) manual override (x-factor) that may be set by a system administrator to skew the curve if necessary; (13) average and anticipated "hold" times; (14) number of leads available; and (15) the trends of these factors and/or others.

In some embodiments, any or all of the above-identified factors may be selectively weighted. By way of example, three different factors such as (i) closing ratio based upon a specific vendor and/or destination, (iii) total sales over a selected time frame with respect to a selected vendor and/or destination, and (iii) total SQi (Service Quality Index) scores may be selected by the system administrator and weighted equally (i.e., ⅓, ⅓, ⅓) to determine agent rankings and tiers. Alternatively, these and/or other selected factors may be provided with different weights to skew the rankings in favor of one or more factors.

In some embodiments, after agent rankings have been determined, each agent is slotted in a "tier" level that is based on the agent's ranking in comparison to the other agents. Any number of tiers may be employed, and this number may increase or decrease over time as agents are added or subtracted from the available pool. In some embodiments, agent ranking component 162 may be configured to calculate tiers periodically and storing in database 132. For example, tiers may be calculated on a daily basis (e.g., every night), hourly, weekly, etc. When a new lead is submitted, agent ranking component 162 may be configured to accesses the agent tier information stored in database 132 (or dynamically created) and determine the total available agents based on the vendor/supplier specialty submitted by a customer care. In some embodiments, agent ranking component 162 may be configured to group all of agents together and sort them, for example, from the highest ranking to the lowest.

Assigning Leads to Agents

In some embodiments, leads distribution component 164 may be configured to distribute or assign a lead to an agent based on the likelihood of the lead conversion event occurrence determination and agent ranking determination. That is, by distributing leads with a high likelihood of conversion to higher ranked agents ensures that the leads actually get converted. For example, a high performing agent is likely to close or convert a lead than a low performing agent. Because a lead that has a high likelihood of conversion is highly valuable (i.e., it will likely result in a sale), allowing the high performing agent to work on the leads with a high score ensures that potential opportunity will likely not missed. That is because a low performing agent is likely not to convert event a high scored lead.

In some embodiments, leads distribution component 164 may be configured to ensure that the high ranked agents are always receiving leads that have a high likelihood of conversion. In particular, because agents are ranked higher when their actual performance exceeds their expected performance, as alluded to above, a highly ranked agent that only meets their expected performance predictions will end up receiving a lower ranking and thus no longer meet the criteria for getting "higher quality" leads. Conversely, agents that were not expected to perform well actually end converting the "lower quality" leads end up receiving a higher ranking and thus become eligible for getting those "higher quality" leads. Accordingly, by continuously assessing agent performance, lead distribution system 100 ensures a leveled playing field for agents of various performance levels.

In some embodiments, leads distribution component 164 may be configured to exclude agents that are ranked below a particular level when distributing leads based on a number of leads available, a time period associated with unclaimed lead. For example, agents deemed "poor performers" may be excluded from a distribution when a number of unclaimed leads is low and/or when the unclaimed leads have not been unclaimed for a particular time period. Alternatively, leads distribution component 164 may be configured to consider agents that are ranked below a particular level when distributing leads when a number of unclaimed leads is high and/or when a time period associated with unclaimed lead is longer than a particular time period (e.g., more than 24 hours).

In some embodiments, leads distribution component 164 may be configured to distribute leads automatically rather than wait for agents to claim them. For example, upon receiving agent's log-in credentials, a particular number of leads may be automatically assigned to that agent based on the type of lead and/or other lead attributes including a likelihood of a conversion event occurrence determination. By virtue of automatically assigning or earmarking leads to a qualified agent, lead distribution system 100 avoids leads being claimed by lower ranked agents, for example in the event of a number of unclaimed leads being high and/or when a time period associated with unclaimed lead is longer than a particular time period, as alluded to above. In some embodiments, leads distribution component 164 may be configured to distribute leads automatically without first receiving agent's log-in credentials. Instead, leads may be earmarked to high performing agents for a particular time period.

In some embodiments, leads monitoring component 166 may be configured to continuously monitor ranking scores assigned to agents. For example, by continuously monitoring actual agent performance, leads processing system 100 ensures that the ranking scores accurately predict future agent performance.

In some embodiments, leads monitoring component 166 may be configured to periodically update the ranking score or agency performance index (API), previously determined for all participating agents, as alluded to above. For example, the ranking score may be updated nightly.

FIG. 3 illustrates a flow diagram describing a method for updating a raking assigned to an agent based on the updated information related to lead conversion, in accordance with one embodiment. In some embodiments, method 300 can be implemented, for example, on a server system, e.g., leads processing server 130, as illustrated in FIG. 2.

At operation 310, leads processing server 130 obtains information related to converted leads during a particular time period. For example, the information related to converted leads may be obtained for a period since the last time this process was performed. At operation 320, leads processing server 130 obtains lead scores associated with the leads in step 310. For example, the lead score may be generated by leads scoring component 160. At operation 330, leads processing server 130 obtains agent's expected performance. For example, expected performance may be generated by agent ranking component 162. At operation 340, agent ranking component 162 determines actual performance based on the converted lead information obtained in in step 310 and lead score obtained in step 320. At operation 350, agent ranking component 162 compares previously determined agent's expected performance to actual performance determined in step 330. At operation 360, upon determining that actual agent performance exceeds previously determined expected performance, agent ranking component 162 updates previously determined ranking score assigned to the agent.

Various embodiments of the present disclosure enable lead distribution that results in fully capturing potential sales opportunity associated with leads that have a high likelihood of conversion.

Figure 4:
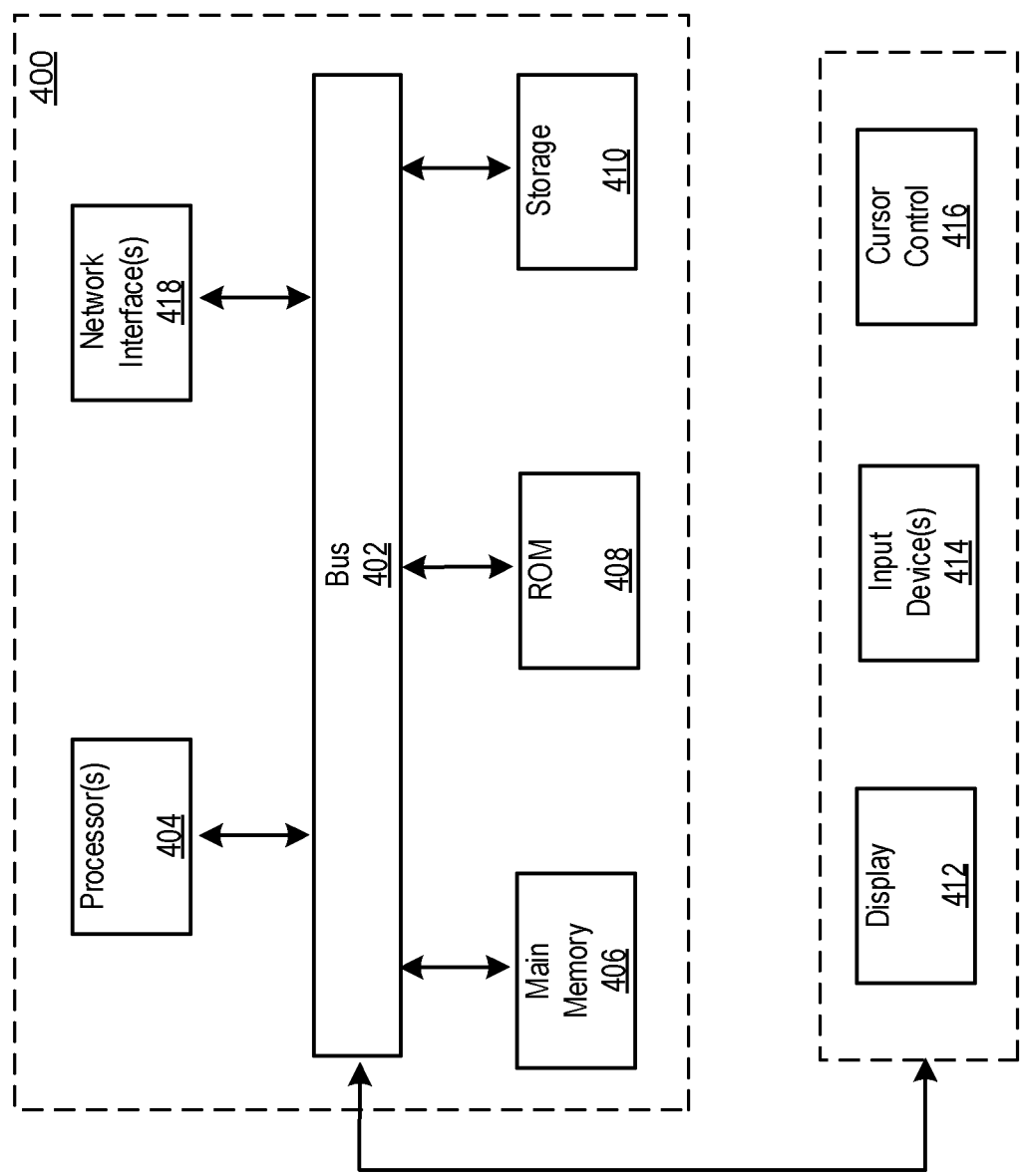
FIG. 4 illustrates an example computing system that may be used in implementing various features of embodiments of the disclosed technology.

FIG. 4 depicts a block diagram of an example computer system 400 in which various of the embodiments described herein may be implemented. The computer system 400 includes a bus 402 or other communication mechanism for communicating information, one or more hardware processors 404 coupled with bus 402 for processing information.

Hardware processor(s) 404 may be, for example, one or more general purpose microprocessors.

The computer system 400 also includes a main memory 404, such as a random access memory (RAM), cache and/or other dynamic storage devices, coupled to bus 402 for storing information and instructions to be executed by processor 404. Main memory 404 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 404. Such instructions may be read into main memory 404 from another storage medium, such as storage device 410. Execution of the sequences of instructions contained in main memory 404 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 404. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A system for determining a likelihood of a lead conversion event, the system comprising:
one or more physical processors configured to execute machine-readable instructions to:
obtain lead attribute information associated with a lead received in an incoming request;
determine historic booking information associated with leads submitted by one or more customers prior to submitting the incoming request; and
determine a likelihood of a lead conversion event for the lead using a machine learning model.

2. The system of claim 1, wherein the historic booking information associated with the leads submitted by one or more customers prior to submitting the incoming request comprises leads having lead information including vendor class associated with the lead received in the incoming request.

3. The system of claim 1, wherein the lead attribute information comprising individual lead factors including at least one of a lead type, a lead submission method, a lead submission urgency level, and a vendor class.

4. The system of claim 1, wherein the leads submitted by the one or more customers prior to submitting the incoming request comprise a date of submission, and wherein the date of submission does not exceed 12 months from a date of the lead received in the incoming request.

5. The system of claim 1, wherein determining the likelihood of the lead conversion event for the lead received the incoming request comprises assigning a weight to each of the individual lead factors.

6. The system of claim 1, wherein determining the likelihood of the lead conversion event for the lead received the incoming request is based on the lead attribute information and the historic booking information.

7. The system of claim 6, wherein determining the likelihood of the lead conversion event for the lead received the incoming request comprises using a predictive model.

8. The system of claim 1, wherein the predictive model includes Bayesian statistics.

9. The system of claim 1, wherein the lead conversion event for the lead comprises a sales transaction.

10. The system of claim 1, further comprising obtaining online behavior information associated with the one or more customers submitting the incoming request, the online behavior information including time spent on a website by the one or more customers prior to submitting the request.

* * * * *